United States Patent [19]

Price et al.

[11] Patent Number: 5,017,200
[45] Date of Patent: May 21, 1991

[54] BAGHOUSE

[75] Inventors: Thomas L. Price, Whitefish; Richard A. Walli, Oshawa, all of Canada; Peter G. Phipps, Sudbury, Canada

[73] Assignee: Inco Limited, Canada

[21] Appl. No.: 584,697

[22] Filed: Sep. 19, 1990

[30] Foreign Application Priority Data

Oct. 2, 1989 [CA] Canada ................................ 2000025

[51] Int. Cl.$^5$ .............................................. B01D 46/04
[52] U.S. Cl. ................................ 55/96; 55/97; 55/290; 55/302; 55/341.1; 55/341.6; 55/354; 55/379
[58] Field of Search ..................... 55/96, 97, 290, 302, 55/341.1, 341.5, 341.6, 351, 353, 354, 379

[56] References Cited

U.S. PATENT DOCUMENTS

| | | | |
|---|---|---|---|
| 4,257,790 | 3/1981 | Bergquist et al. | 55/379 |
| 4,303,425 | 12/1981 | Cox | 55/378 |
| 4,790,934 | 12/1988 | Shishkin et al. | 55/351 X |

FOREIGN PATENT DOCUMENTS 1432005  8/1969  Fed. Rep. of Germany .
1213836 10/1960  France .

Primary Examiner—Charles Hart
Attorney, Agent, or Firm—Francis J. Mulligan, Jr.; Blake T. Biederman

[57] ABSTRACT

A baghouse chamber divided into an inlet for receiving a gas stream containing particulates, an outlet for exiting said gas stream after filtering, a main chamber and an auxiliary chamber. At least one filter bag is housed within the main chamber for filtering said gas stream. The filter bag has an extension portion extending through a connection into the baghouse chamber. The connection prevents particulate from bypassing the outlet of the baghouse chamber and allows for pulling a replacement filter bag attached to the extension portion into the main chamber. A removal means is attached to the baghouse for transporting the at least one operable filter bag to the auxiliary chamber and for pulling the replacement filter bag into the main chamber.

20 Claims, 3 Drawing Sheets

BAGHOUSE

BACKGROUND OF ART AND PROBLEM

The art of fabric filtration has been practiced for a number of years in the removal of particulates from gas streams. The basic principal employed is that particulates in a gas stream are prevented from passing through a fabric having sufficiently smaller air passages than the particles desired to be trapped. Flow of the gas stream through the fabric is such that the mechanisms of impaction, interception and diffusion cause the particles to become entrapped. Initially, particles are captured on and within the fabric. Eventually, particles are captured by a built up "cake" of particulates which covers the fabric.

There are a variety of methods employed to direct and filter a gas stream to entrap particulates. These methods also include a means of periodic cleaning with pressurized gas to extend the useable life of fabric filter media Typically, filter media must be replaced as it becomes blinded or perforated.

Generally, contaminated gas enters a dirty gas plenum, passes through the filtration fabric and exits through a clean gas plenum. The method of mounting and replacing filter media varies according to specific manufacturers' designs.

Some designs use a rigid self supporting fabric. The rigid fabric is formed into a desired shape and mounted in frames. These rigid fabric filters are commercially known as "cartridges." Cartridges have the ability to collect the particulates on either side of the fabric, depending on the design employed.

Other designs use fabric that has been shaped into tubes or envelopes in the form of filter bags, also commercially known as simply "bags." The bags are attached to orifices in a tube sheet. The purpose of the tube sheet is to direct the gas flow to the inside of the filter bag, thus forcing gas to pass through fabric of the filter bag before it can exit through the clean air plenum. Units designed in this manner collect particulates on the inside of the bag and generally require periodic shaking to dislodge the particulates. Dislodged particles are allowed to drop to a collection area below a tube sheet. Reverse air flow through the fabric bags can also be used to assist in dislodging particulates. Optionally, reverse air flow through the bags functions as the primary means of particulate removal.

Other designs also use a fabric which has been formed into filter bags. The filter bags are suspended from an orifice into a dirty gas plenum where gas is forced to pass through the fabric of the suspended bags to enter the center of the bag and to exit through the orifice into a clean gas plenum. Periodic cleaning of the fabric is accomplished by sending a pressure jet of air through the suspended bags in a reverse flow direction. This type of design requires a rigid cage structure to prevent collapse of the filter bag.

All of these devices require that periodic servicing be conducted. Servicing involves replacement of used media, thus exposing personnel to particulate matter. Although some designs have attempted to minimize this exposure, particularly cartridge type designs, there are no designs which eliminate personnel exposure to particulates. Some tube type units are designed to allow removal of a complete bank of tubes to a service area where they are manually serviced. In designs where the fabric bags are suspended, attempts have been made to service the bags entirely from the clean air plenum. However, due to small amounts of very fine material passing through the fabric into the clean air plenum, the clean air plenum is not entirely free of particulates.

Another problem with bags is fabric ruptures. When fabric ruptures occur, the downstream gas becomes contaminated with particulates. Tracer particles sensitive to ultraviolet light are sent through the baghouse to locate the rupture. Once the rupture is located, which can be difficult, the fabric is replaced.

It is an object of this invention to provide a particulate free environment for personnel replacing baghouse filter bags.

It is another object of this invention to provide a baghouse which permits replacement of filter bags while operating the baghouse to improve on-stream availability.

It is another object of this invention to provide a baghouse design which facilitates replacement of filter bags.

It is another object of this invention to provide a clean method and apparatus for disposing of used filter bags.

It is another object of this invention to increase baghouse cleaning efficiency and the amount of particulates removed.

It is another object of this invention to limit downstream contamination due to fabric rupture.

It is another object of this invention to simplify detection of fabric ruptures.

SUMMARY OF INVENTION

The invention provides a gas cleaning system employing at least one fabric filter bag having an inside and an outside surface. The system has means for causing gas laden with particulate to impinge on one of the surfaces of the fabric filter bag and be filtered thereby. The system has means operable to move fresh portions of at least one fabric filter bag or an extension thereof into gas impingement position. Additionally, the system has means within the cleaning system operating in conjunction with means to move at least one fabric filter to collect filtered particulate and used fabric filter.

In a more particular embodiment of the invention, the baghouse has an inlet for receiving a gas stream containing particulate, an outlet for exiting the gas stream after filtering, a main chamber for housing at least one operable filter bag and an auxiliary chamber for disposing of at least one filter bag. At least one filter bag is kept within the main chamber for filtering the gas stream. The at least one filter bag has an extension portion extending through a connection in the baghouse chamber. The connection has the function of preventing particulate from bypassing the outlet of the baghouse chamber and allowing pulling of a replacement filter bag attached to an extension portion through the connection into the main chamber. A removal means is attached to the baghouse chamber for transporting the at least one operable filter bag to the auxiliary chamber and for pulling the replacement filter bag into the main chamber.

The method of the invention involves changing a baghouse employing at least one fabric filter bag having an inside and an outside surface. The method includes means for filtering particulate from gas laden with particulate by impinging particulate on one of the surfaces of the at least one fabric filter bag. The method also includes means for moving fresh portions of at least one fabric filter bag or an extension thereof into gas impingement position. Additionally, the method of the invention includes means for collecting filtered particulate and used fabric filter within the baghouse.

A more particular method of the invention involves introducing at least one operable filter bag into a baghouse with an extension portion of the operable bags extending through a connection into a main chamber of the baghouse. The connection serves to prevent particulate from escaping the main chamber. The replacement filter bag is attached to an extension portion of the at least one operable filter bag. The at least one operable filter bag is removed from inside of the main chamber into an auxiliary chamber of the baghouse chamber to force the replacement bag into the main chamber. The extension portion of the replacement filter bag is pulled into the main chamber.

PREFERRED EMBODIMENT OF PREFERRED INVENTION

Figure 1:
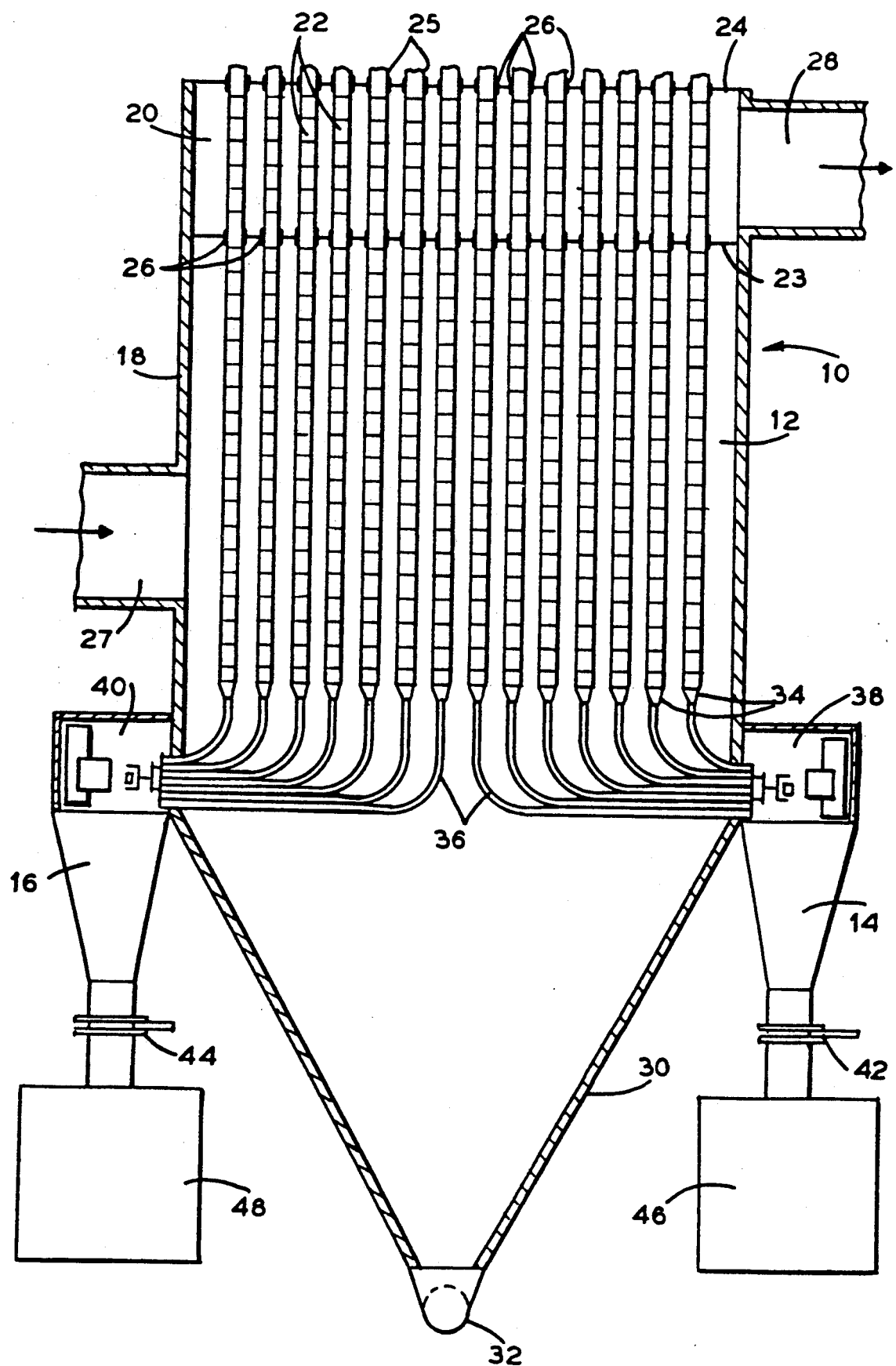
FIG. 1 is a schematic cross-section of a baghouse.

Referring to FIG. 1, there is shown a fabric filtration unit or baghouse 10. Baghouse 10 is divided into a main chamber 12 and auxiliary chambers 14 and 16. The main chamber 12 of baghouse 10 is divided into dirty gas plenum 18 and clean gas plenum 20. Main chamber 12 holds at least one operable filter bag 22 which extends through dirty gas plenum 18, separation sheet 23, clean gas plenum 20 and top sheet 24. Preferably, main chamber 12 holds more than one filter bag 22 for increased filter area. An operable filter bag is defined as a bag positioned in a baghouse where it is capable of filtering particulates from a contaminated gas stream. Extension portions 25 of filter bags 22 extend through top sheet 24. Filter bags 22 all preferably are cylindrically shaped and have the same diameter. The diameter of filter bags 22 and the diameter of holes through separation sheet 23 and top sheet 24 are about equal to allow seals 26 to limit gas flow between filter bags 22 and sheets 23 and 24.

Dirty gas enters inlet 27 into dirty gas plenum 18 of main chamber 12. The gas flows through filter bags 22 which removes particulates from the gas. The filtered gas then flows within filter bags 22 to a location adjacent clean gas plenum 20. Gas then flows out of filter bags 22 into clean gas plenum 20 for a secondary removal of particulates. Gas within clean gas plenum 20 is finally removed through outlet 28. The two plenum design of the invention, dirty gas plenum 18 and clean gas plenum 20, increases operating efficiency of the baghouse 10. Preferably, the baghouse removes enough particulates to permit direct release of gas into the atmosphere without requiring a stack. Separation sheet 23 and seals 26 prevent most gas from bypassing filter bags 22 during movement from dirty gas plenum 18 to clean gas plenum 20. Top sheet 24 and seals 26 and a sealed tail cone (see FIG. 2) prevent most gas from not exiting through outlet 28. Dust or particulates inside of dirty gas plenum 18 falls into hopper 30 where the dust is collected and removed by dust conveyer 32.

Lower ends of filter bags 22 are supported by bag funnels 34 which are attached to dirty bag tubes 36. The dirty bag tubes 36 pass through the dust hopper 30 into auxiliary chambers 14 and 16 for withdrawal and disposal of filter bags 22. When it is desired to replace filter bags 22, replacement bags (not illustrated) are attached to the extension portions 25 of filter bags 22. Preferably, extension portions 25 are simply continuations of filter bags 22 in the form of a tubular fabric bag. The replacement bags may be attached by any known method to the operable filter bags 22, such as stitching, taping, gluing and fusing the bags together.

Dirty filter bags 22 are removed from main chamber 12 through bag funnels 34 and dirty bag tubes 36. The dirty bag tubes 36 are routed to auxiliary chambers 14 and 16 where removal means 38 and 40 are provided for drawing or pulling filter bags 22 through baghouse 10. Removal means 38 and 40 are sealed from the atmosphere to minimize or eliminate personnel exposure to particulates. When filter bags 22 are drawn through baghouse 10 into auxiliary chambers 14 and 16, replacement bags attached to extension portions 25 of operable filter bags 22 are pulled through top sheet 24 and separation sheet 23 until the replacement bags become operable filter bags 22. The invention provides for replacement of filter bags 22 while baghouse 10 is operating. There is no requirement to interrupt operations of baghouse 10 during replacement of filter bags 22.

The removal means 14 and 16 may be constructed of any known means of pulling one of filter bags 22. Preferably, mechanical removal means 38 and 40 is of a screw-type design to pull and cut up filler bags 22 from dirty bag tubes 36. Cut pieces of filter bags 22 fall through isolation valves 42 and 44 into portable compartments 46 and 48. To dispose of the pieces of filter bags 22 and dust particles, isolation valves 42 and 44 are closed and portable compartments 46 and 48 are used to dispose of the dirty filter bags and the dust without exposing personnel to particulates.

Rupture of one of filter bags 22 is readily detectable with the apparatus of the invention. First tracer particles are sucked into dirty gas plenum 18. Tracers particles enter the ruptured bag in the dirty gas plenum 18 and are trapped inside the bags in clean gas plenum 20, where the tracer particles are readily detectable with an ultraviolet light source. This feature simplifies the procedure for detecting leaks, limiting shutdown of baghouse 10.

Figure 2:
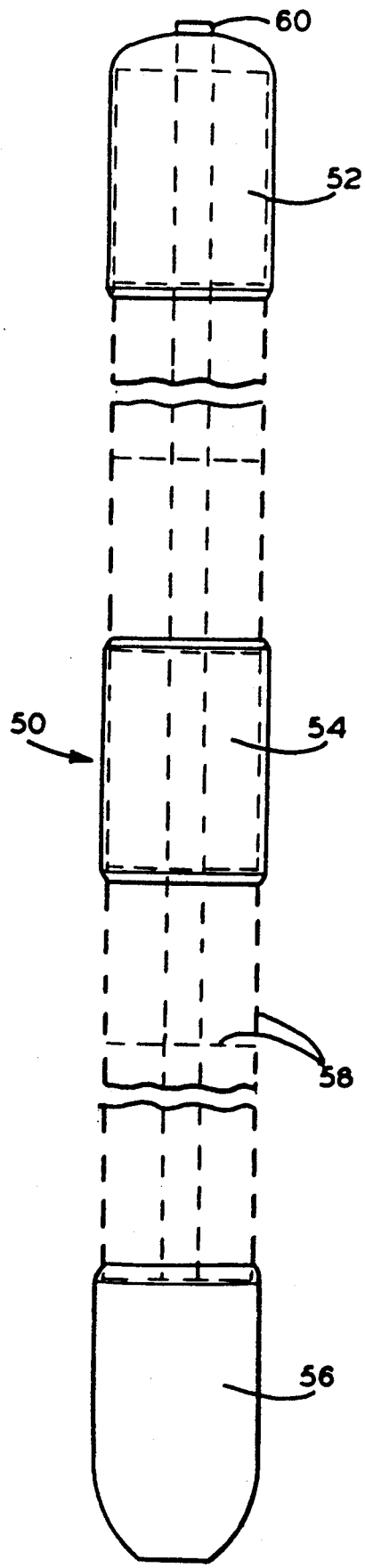
FIG. 2 is a schematic cross-section of a support cage used to support a filter bag within the baghouse of FIG. 1.

Referring to FIG. 2, filter bags (22 of FIG. 1) is supported by a cage assembly 50. Cage assemblies 50 are each divided into tail cone 52, middle support cylinder 54, nose cone 56 and cage frame 58. Preferably, tail cone 52, middle support cylinder 54 and nose cone 56 are fabricated from light gauge metal having no rough surfaces and smooth contoured edges. The metal selected may be any formable metal. However, corrosion resistant metals such as stainless steel, nickel-chrome plated steel and the like are preferred. Additionally, materials such as plastics, fiberglass and other composites may be utilized. Smooth edges and surfaces are desired to prevent ruptures or tears in filter bags (22 of FIG. 1). Tail cone 52 has fitting 60 which serves several functions. Fitting 60 may be used for visual inspection, for connecting filter bags (22 of FIG. 1) to a periodic pressure pulse to clean filter bags (22 of FIG. 1), for vacuum cleaning filter bags (22 of FIG. 1) that have become internally plugged due to filter bag rupture and for removing the entire cage assembly 50.

Nose cone 56 is shaped to nest inside of funnels (34 of FIG. 1). Tail cone 52 and middle cylindrical support 54 are shaped to fit through cylindrical holes in separation sheet 23 and top sheet 24 with a filter bag covering the cage assembly 50. Middle cylindrical support 54 and tail cone 52 in combination with seals 26 prevent gas from compressing the filter bag. This prevents gas from escaping into the clean gas plenum (20 of FIG. 1) from the dirty gas plenum (18 of FIG. 1) and prevents gas from entering into the clean gas plenum (20 of FIG. 1) from the atmosphere.

Figure 3:
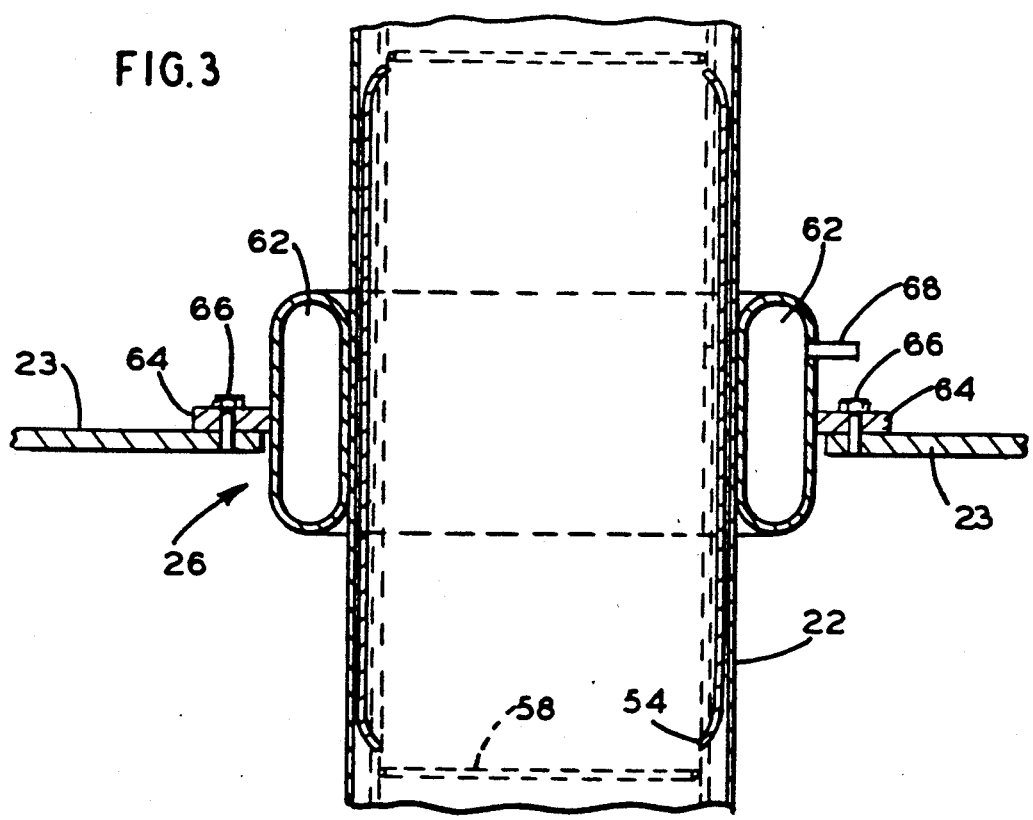
FIG. 3 is a schematic cross-section of a seal between a filter bag and a separation sheet between the clean gas plenum and the dirty gas plenum of the baghouse of FIG. 1.

Referring to FIG. 3, seals 26 are preferably each constructed having a doughnut shaped bellow 62 which decreases the amount of gas escaping between filter bag 22 and separation sheet 23. Bellow 62 is attached with flange 64 and fasteners 66. Bellow 62 is preferably constructed of a light gauge expandable material which allows bulging when pressure is internally applied. Pressure may be applied by having bellow 62 thermally extend or by applying pressure through valve 68. Bellow 62 also is constructed to thermally contract or deflate to allow bag withdrawal. Expandable joints, similar to bellow 62, are preferably used at every connection where filter bags 22 pass through separation sheet 23 and top sheet 24. Seals 26 have sufficient sealing power to prevent particles from escaping, but allow slipping movement of filter bags (22 of FIG. 1) when replacement bags are being drawn into position.

Figure 4:
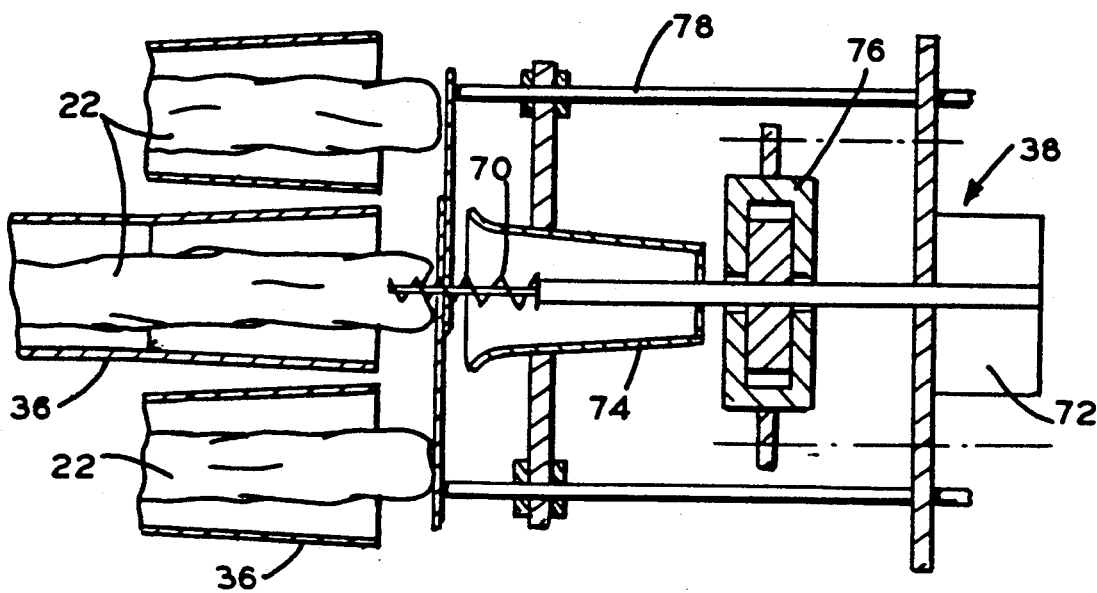
FIG. 4 is a schematic cross-section of a mechanical removal means located within an auxiliary chamber of FIG. 1.

Referring to FIG. 4, mechanical withdrawal device 38 is capable of indexing both vertically and horizontally on a carrier to align with tubes 36. On one side of auxiliary chamber 14 (See FIG. 1) the compartment there is a plurality of reducers arranged in a ordered pattern. Optionally, a window (not illustrated) allows personnel to visually monitor mechanical withdrawal device 38.

Withdrawal device 38 consists of a screw 70 driven by motor 72, containment cone 74, advancing mechanism 76 for screw 70 and an advancing device 78 for the containment cone 74. Bags 22 are withdrawn by advancing the containment cone 74 and screw 70 forward to the face of one of dirty bag tubes 36. The diameter of the end of dirty bag tubes 36 is enlarged to simplify positioning of screw 70 within tubes 36. The screw 70 is then driven forward by the advancing mechanism 76 at a speed synchronous with the pitch of the screw 70 and the rotation speed of the motor 72. After reaching full stroke on the advancement of screw 70, screw 70 is withdrawn in to cone 74. A cutting device (not illustrated), such as a scissors device, is then activated and the portion of the bag 22 withdrawn is severed. Screw 70 and containment cone 74 are then withdrawn full stroke simultaneously. Screw 70 is then reversed and the portion of bag 22 that has been severed is dropped into a hopper below (See FIG. 1). The action is then repeated until a sufficient quantity of a filter bag 22 has been drawn through and a replacement bag becomes operable filter bag. The withdrawal mechanism can then be indexed to another filter bag 22 and the process repeated.

The invention provides several benefits and improvements. The invention provides a particulate free environment for personnel replacing baghouse filter bags. Another unique feature is the invention allows replacement of filter bags while operating the baghouse to improve on-stream availability. The invention facilitates simple replacement of filter bags and provides a clean method and apparatus for disposing used filter bags. The two plenum design of the invention increases cleaning efficiency and may eliminate the need for gas removal stacks. Finally, the invention limits downstream contamination due to fabric rupture and simplifies detection of fabric ruptures.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A gas cleaning system employing at least one fabric filter bag having an inside and outside surface of said fabric filter bag and be filtered thereby;
   A. means for causing gas laden with particulate to impinge on one of said surfaces of said fabric filter bag and be filtered thereby;
   B. means operable to move fresh portions of said at least one fabric filter bag or an extension thereof into gas impingement position; and
   C. means within said gas cleaning system operating in conjunction with said means of "B" to collect filtered particulate and used fabric filter.

2. The gas cleaning system of claim 1 additionally including:
   D. means to withdraw filtering gas from the other of said surfaces.

3. The gas cleaning system of claim 1 wherein said gas cleaning system includes a main chamber divided into a clean gas plenum and a dirty gas plenum.

4. A baghouse comprising:
   a baghouse chamber having an inlet for receiving a gas stream containing particulate, an outlet for exiting said gas stream after filtering, a main chamber for housing at least one operable filter bag and an auxiliary chamber for disposing of at least one filter bag,
   at least one operable filter bag in said main chamber for filtering said gas stream, said at least one operable filter bag having an extension portion extending through a connection into said baghouse chamber, said connection being for preventing particulate from bypassing said outlet of said baghouse chamber and for allowing movement of a replacement filter bag attached to said extension portion through said connection into said main chamber, and
   a removal means attached to said baghouse chamber for transporting said at least one operable filter bag to said auxiliary chamber and for pulling said replacement filter bag into said main chamber.

5. The baghouse of claim 4 wherein said main chamber includes a clean gas plenum.

6. The baghouse of claim 5 wherein said extension portion extends through said clean gas plenum.

7. The baghouse of claim 4 wherein the extension portion is an end of a cylindrical fabric filter bag.

8. The baghouse of claim 4 wherein said at least one filter bag is constructed of a fabric tube and said fabric tube is supported by a rigid cylindrical cage structure.

9. The baghouse of claim 4 wherein a tail cone within said at least one operable filter bag is used for preventing particulate from escaping through said bag house chamber and for allowing movement for pulling said replacement filter bag into said main chamber.

10. The baghouse of claim 9 wherein said tail cone has a fitting for attachment of a pressurized pneumatic line.

11. The baghouse of claim 4 wherein said removal means is automated.

12. The baghouse of claim 4 wherein an end portion of said at least one filter bag is housed within bag tubes for directing said filter bag toward said removal means.

13. A method for changing a baghouse employing at least one fabric filter bag having an inside and an outside surface comprising:
    A. means for filtering particulate from gas laden with particulate by impinging particulate on a surface of said at least one fabric filter bag;
    B. means for moving fresh portions of at least one fabric filter bag or an extension thereof into gas impingement position; and
    C. means for collecting filtered particulate and used fabric filter within said baghouse.

14. The method of claim 13 additionally including:
    D. means for withdrawing gas from the other of said surfaces.

15. The method of claim 13 wherein said gas cleaning system is divided into a clean gas plenum and a dirty gas plenum.

16. A method of changing a baghouse with minimal exposure of particulates to personnel comprising:
    introducing at least one operable filter bag into a baghouse chamber, having an extension portion of said at least one operable bag extending through a connection into a main chamber of said baghouse chamber, said connection serving to prevent particulate from escaping said main chamber,
    attaching a replacement filter bag to said extension portion of said at least one operable filter bag, and
    removing said operable filter bag from inside of said main chamber into an auxiliary chamber of said baghouse chamber to force said replacement filter bag into said main chamber with an extension portion of said replacement filter bag pulled into said main chamber.

17. The method of claim 16 wherein said extension portion of said at least one operable filter bag extends through a clean gas plenum.

18. The method of claim 16 wherein said operable and replacement filter bag are constructed of fabric tubes.

19. The method of claim 16 wherein said replacement filter bag is fused to an end of said at least one operable bag extending through said main chamber.

20. The method of claim 10 including the additional steps of periodically sending a pulse of compressed gas to clean said at least one operable filter bag.

* * * * *